United States Patent [19]
Pettit

[11] Patent Number: 5,951,800
[45] Date of Patent: Sep. 14, 1999

[54] FIBER/METAL LAMINATE SPLICE

[75] Inventor: Richard G. Pettit, La Habra, Calif.

[73] Assignee: McDonnell Douglas Corp., Long Beach, Calif.

[21] Appl. No.: 08/978,946

[22] Filed: Nov. 26, 1997

Related U.S. Application Data

[60] Continuation of application No. 08/670,087, Jun. 25, 1996, which is a division of application No. 07/977,895, Nov. 18, 1992.

[51] Int. Cl.$^6$ .............................. B32B 3/00; B32B 15/08
[52] U.S. Cl. .................. 156/157; 156/229; 156/304.3; 156/304.1; 156/307.7; 244/123; 244/133; 428/58; 428/61; 428/608; 428/626
[58] Field of Search ........................... 156/304.1, 304.3, 156/307.7, 306.6, 229; 428/57, 58, 61, 608, 626, 77, 416, 418, 189, 458, 246, 213, 215; 244/119, 133, 123, 124, 120

[56] References Cited

U.S. PATENT DOCUMENTS

| | | | |
|---|---|---|---|
| 3,919,030 | 11/1975 | Jones | 156/304.3 |
| 4,072,787 | 2/1978 | Ricks | 428/594 |
| 4,156,054 | 5/1979 | Gurewitsch | 428/57 |
| 4,279,676 | 7/1981 | Morrison et al. | 156/304.5 |
| 4,489,123 | 12/1984 | Schijve et al. | 428/416 |
| 4,715,923 | 12/1987 | Knoll | 244/382 |
| 4,992,323 | 2/1991 | Vogelesang et al. | 428/215 |
| 5,160,771 | 11/1992 | Lambing et al. | 428/57 |
| 5,429,326 | 7/1995 | Garesche et al. | 244/133 |

*Primary Examiner*—Richard Crispino
*Assistant Examiner*—Michael A Tolin
*Attorney, Agent, or Firm*—Stout Uxa. Bryans & Mullins, LLP; Donald E. Stout

[57] ABSTRACT

Currently, fiber/metal laminate sheets are limited in width due to restrictions in the width of thin metal sheets available. This invention solves that problem by providing an integral splice concept and a method for manufacturing a laminate employing the inventive concept. Specifically, a fiber/metal laminate sheet is provided having at least two metal plies and at least one fiber layer. Each of the metal plies comprises at least two metal sheets which are arranged side-by-side and have sheet metal breaks therebetween. All of the sheet metal breaks lie within the integral splice. An important feature of the invention is that the sheet metal breaks in each metal ply are staggered widthwise across the laminate with respect to the sheet metal breaks in the remaining metal plies, in accordance with a predetermined metal break staggering pattern, thereby maximizing the bond engagement of the discontinuous metal plies with the adjacent fiber layers. Another important inventive feature is that the fiber layers are continuous through the integral splice region. The resultant spliced laminate may have any desired width, and is strong, fatigue-resistant, durable, and easy to manufacture.

4 Claims, 2 Drawing Sheets

FIBER/METAL LAMINATE SPLICE

This is a continuation of application Ser. No. 08/670,087, filed Jun. 25, 1996, which is a divisional of Ser. No. 07/977,895, filed Nov. 18, 1992.

BACKGROUND OF THE INVENTION

This invention relates to fiber/metal laminate sheets for use in structural applications, and a method for constructing same, and more particularly to an integral splice concept for fastening a plurality of such sheets together in a simple, strong, and durable manner.

Fiber/metal laminates comprising alternating plies of sheet metal (such as aluminum) and fibers are well known and frequently used in the prior art, but have to date been limited in width due to metal rolling limitations for thin sheets. Increased material widths are needed for the increasingly extensive uses planned for these types of laminates particularly in aerospace applications, because they are much lighter in weight than comparable metal structures, yet have favorable strength properties. Conventional joining methods typically add considerable additional hardware to join two or more finished laminate sheets, thus adding weight and complexity which often complicates the geometry of built-up structures.

What is needed, therefore, is a concept for integrally joining two pieces of fiber/metal laminate to create a double (or multiple) width sheet with a minimum of geometric disruption and weight, and a joint strength which equals or exceeds the strength of the surrounding material.

SUMMARY OF THE INVENTION

This invention solves the problem outlined above by providing an integral splice for a fiber/metal laminate structure, and a method for making same, which is strong, durable, lightweight, and easy to manufacture. Specifically, a fiber/metal laminate structure is provided which comprises at least two metal plies and one fiber layer, though as many as desired of each ply or layer may be used, as long as the total number of metal plies exceeds the total number of fiber layers by one. Each of the metal plies comprise at least two metal sheets. The structure further includes at least one integral splice region therein, for extending a desired dimension of the structure, preferably width, with the number of splice regions depending upon the desired extension of the laminate structure and the consequent number of metal sheets employed in each metal ply. The splice axis is oriented in a direction generally transverse to the direction in which it is desired to extend the laminate. The sheet metal breaks in all of the metal plies all lie within one of the integral splice regions. An important feature of the invention is that the sheet metal breaks in each metal ply are staggered in the extension direction across the laminate with respect to the sheet metal breaks in the remaining metal plies, in accordance with a predetermined metal break staggering pattern, thereby maximizing the bond engagement of the discontinuous metal plies with the adjacent fiber layers.

In another aspect of the invention, a fiber/metal laminate structure is provided which comprises at least two metal plies and at least one fiber layer. The metal plies each comprise at least two metal sheets having sheet metal breaks therebetween, as described above, and the structure further includes at least one integral splice region therein, the sheet metal breaks all being arranged to lie within the at least one splice region. A key feature of the invention is that each fiber layer is arranged to be continuous through each of the integral splice regions, thereby providing load continuity and greater strength and fatigue characteristics through the joint.

In yet another aspect of the invention, a method for constructing a fiber/metal laminate structure comprising at least two metal plies and at least one fiber layer is provided, which comprises the steps of establishing an integral splice region within the structure and forming each of the metal plies by laying two metal sheets adjacent to one another such that there is a sheet metal break therebetween which lies within the integral splice region. Then, the laminate is arranged by ensuring that each of the at least one fiber layers is positioned between adjacent ones of the at least two metal plies. Following this step, the sheet metal breaks are positioned such that the sheet metal break in each metal ply is staggered in the extension direction with respect to the sheet metal breaks in the remaining metal plies in accordance with a predetermined metal break staggering pattern, such that the predetermined width of the fiber/metal laminate structure is greater than the width of one of the metal sheets. An additional important step is then taken, which is to ensure that each of the fiber layers is continuous through the integral splice region. If the design application requires it this method may be repeated for additional integral splice regions until the desired laminate size is obtained.

The above mentioned and other objects and features of this invention and the manner of attaining them will become apparent, and the invention itself will be best understood, by reference to the following description taken in conjunction with the accompanying illustrative drawings.

DETAILED DESCRIPTION OF THE DRAWINGS

Figure 8:
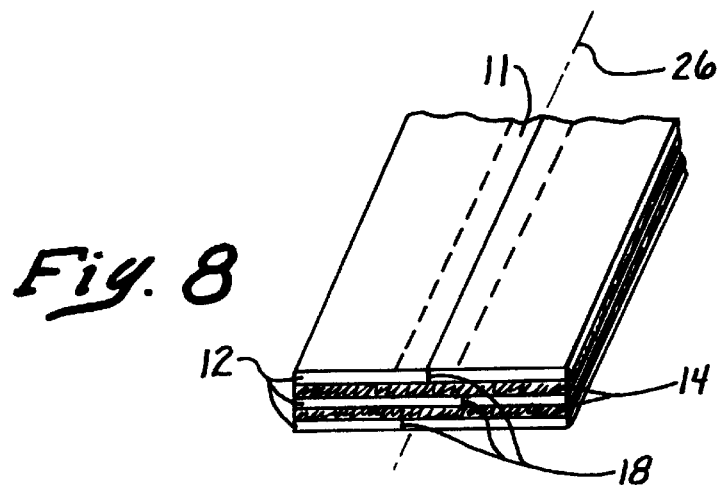
FIG. 8 is a perspective view of a portion of a fiber/metal laminate spliced in accordance with the inventive concept, showing the integral splice region.

The inventive adhesively bonded integral splice concept is shown generically in FIGS. 1–4 and 8 for configurations ranging up to five metallic plies. Referring now to FIG. 8, a fiber/metal laminate 10 is shown, having an integral splice region 11 and including a plurality of metal plies 12 which are alternated with a plurality of fiber/adhesive layers 14.

Figure 1:
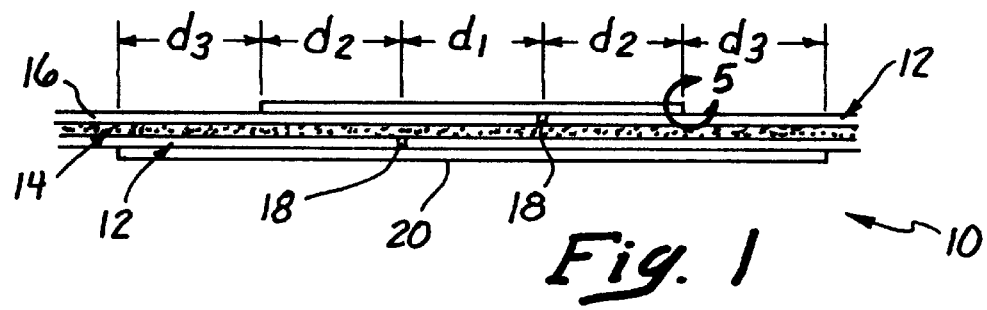
FIG. 1 is a cross-sectional view of a fiber/metal laminate having an integral splice which is constructed in accordance with the principles of this invention, wherein the laminate has two metallic plies and one fibrous layer.
Figure 2:
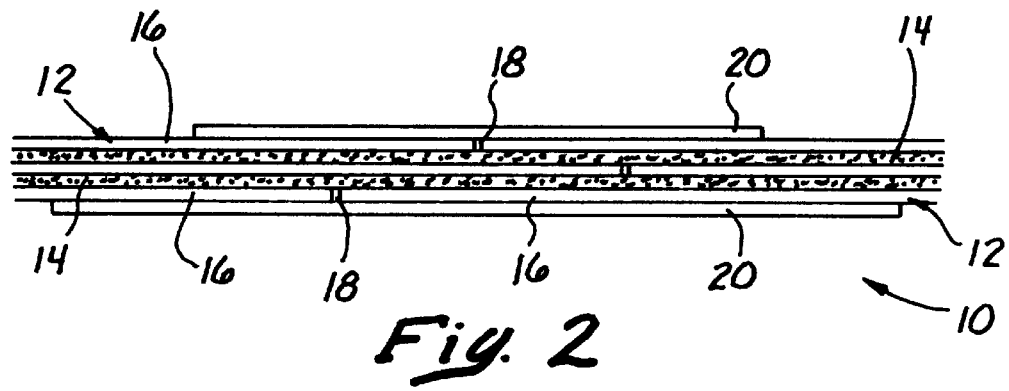
FIG. 2 is a cross-sectional view similar to that of FIG. 1. wherein the laminate has three metallic plies and two fibrous layers.
Figure 3:
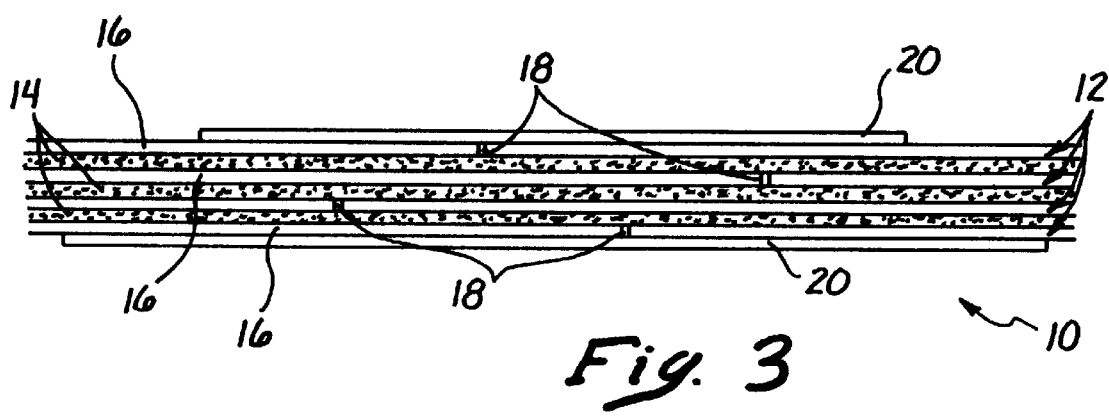
FIG. 3 is a cross-sectional view similar to that of FIG. 1, wherein the laminate has four metallic plies and three fibrous layers.
Figure 4:
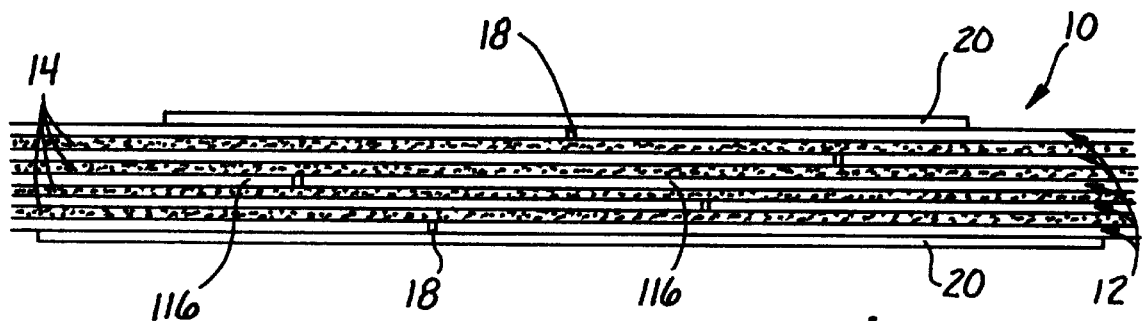
FIG. 4 is a cross-sectional view similar to that of FIG. 1. wherein the laminate has five metallic plies and four fibrous layers.

Now referring to FIGS. 1–4, FIG. 1 shows the minimum number of plies which may be employed, which is two metal plies 12 sandwiching one fiber/adhesive layer 14. FIGS. 2–4 are similar to FIG. 1, except that FIG. 2 shows three metal plies 12 and two fiber/adhesive layers 14, FIG. 3 shows four metal plies 12 and three fiber/adhesive layers 14, and FIG. 4 shows five metal plies 12 and four fiber/adhesive layers 14, The same concept may be extended to more plies as required.

Each metal ply 12 is comprised of sheet metal, which is preferably aluminum, though any type of metal may be used. Because of the limitations of metal rolling manufacturing techniques for thin metal sheets, as discussed above in the Background of the Invention portion of the specification, the width of individual metal sheets is limited, which is the reason for employing the inventive integral splice concept. Thus, in each metal ply 12, there are a plurality of metal sheets 16, with small sheet metal breaks 18 between the sheets 16. An important aspect of the invention is that the sheet metal breaks 18 are staggered positionally from layer to layer across the width of the laminate 10. Therefore, the splice strength may be designed to exceed that of the surrounding material, since the sheet metal breaks are staggered and splice straps 20 reinforce the joint locally. Where strength requirements permit and design requirements demand, one or both of the splice straps may be omitted.

The fiber/adhesive layers 14 are fabricated in a manner known in the art, and comprise aramid, glass, or carbon fibers and a standard metal/bond adhesive such as a known epoxy. Glass fibers are generally preferred in aerospace applications because of their superior fatigue properties, particularly in bi-directional orientations, but aramid fibers are often desirable because of their lighter weight.

The metal-break staggering patterns shown in FIGS. 1–4 and 8 are designed to maximize the bond engagement of the discontinuous metal plies 12 with the adjacent fiber layers 14. Any one of these patterns may be repeated or combined with other patterns shown (or their mirror images) to create other suitable patterns or to splice thicker laminates. The overlap parameters $d_1$, $d_2$, and $d_3$ (see FIG. 1) are specified to ensure splice structural integrity and durability. The $d_1$ parameter defines the linear distance along the width of the structure 10 between the sheet metal breaks 18 in two of the metal plies 12. The $d_2$ parameter defines the linear distance along the width of the structure 10 between each respective sheet metal break 18 and the end of the outboard splice strap 20 which is nearest to that sheet metal break 18. The $d_3$ parameter defines the linear distance along the width of the structure 10 between respective ends of the inboard and outboard splice straps 20 for the external configuration shown in FIGS. 1–4. The $d_1$ and $d_2$ parameters preferably range from about 10 to 60 times the metal sheet thickness, though the upper limit may range to as much as 150 times the metal sheet thickness under certain circumstances. The $d_3$ parameter may range from 0 to about 150 times the metal sheet thickness. Overlap dimensions may exceed this ranges for all three parameters to leave room for mechanical attachments (i.e. for attachment of adjacent frames, stiffeners, or other structure). Metal ply thicknesses preferably range from 8 to 20 mils (0.008 to 0.020 inches).

Figure 5:
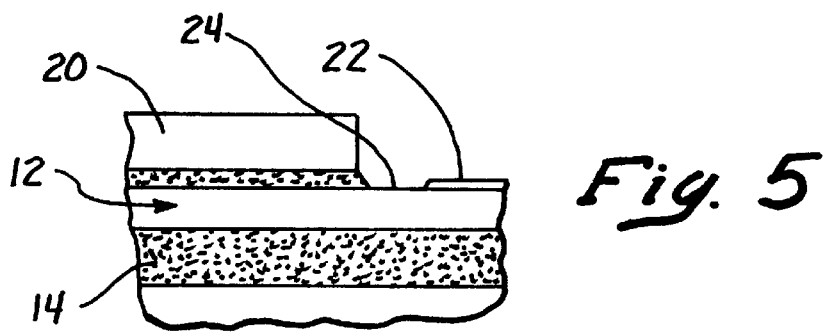
FIG. 5 is a cross-sectional enlarged detail view of a portion of FIG. 1 denoted by the reference letter A, for an optional embodiment employing an aluminum alloy clad with substantially unalloyed aluminum.

FIG. 5 shows an enlargement of the portion A of FIG. 1, for the instance in which the external metal ply 12 comprises an aluminum alloy clad with substantially unalloyed aluminum 22. As depicted in the figure, the clad layer 22 is removed in the immediate vicinity 24 of the bond interface, in order to avoid environmental degradation of the bond.

Again referring to FIGS. 1–4, it should be noted that the splice strap 20 on the lower side of the laminate 10, as depicted, is preferably wider than the splice strap on the upper side. In application, the lower side will typically serve as the inboard side of the laminate, while the upper side will serve as the outboard side. Having a wider inboard splice strap softens the load transition into the strap-reinforced area, and promotes exterior damage inspectability should the laminate begin to fail along the edge of the internal doubler in service.

Another feature of the invention is that each fiber/adhesive layer 14 may consist of more than one fibrous ply or weave, and the fibers may thus be oriented multidirectionally. Consequently, an important feature of the invention is that the fiber/adhesive layers 14 are continuous through the spliced area, thereby providing load continuity for fiber layers which are not parallel to the splice, which in turn increases the splice strength and the overall strength of the laminate.

This invention integrally joins two pieces of fiber/metal laminate to create a double (or multiple) width sheet with a minimum of geometric disruption and weight, and a joint strength which may exceed the strength of the surrounding material, Material spliced by this method may be stretched (pre-stressed) as a single unit to create favorable residual stresses in metallic and fibrous components in a manner similar to existing practice for fiber/metal laminates. After stretching, favorable residual stresses will exist in the splice strap components as well as in the rest of the laminate. Depending on the application, the direction of stretch may be parallel or perpendicular to the splice axis 26 (see FIG. 8), and in either case, a degree of favorable residual compressive stress in the metal plies can be obtained provided the load applied is sufficient to yield the material in the spliced region.

Figure 6:
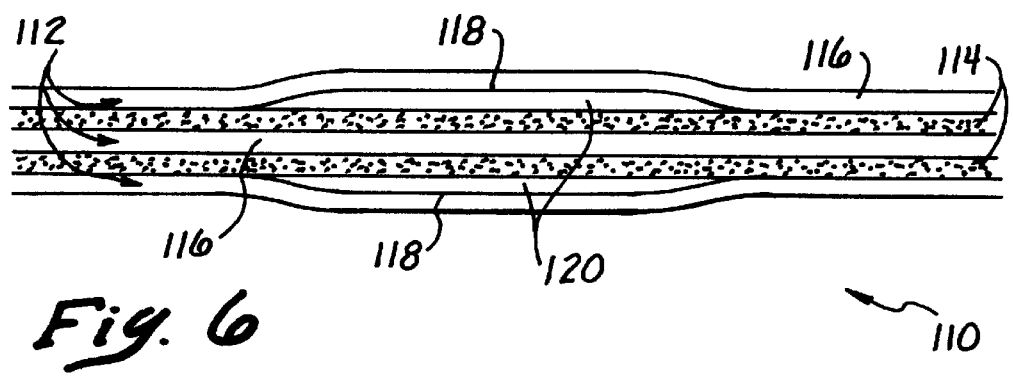
FIG. 6 is a cross-sectional view of a modified embodiment of the invention.

Referring now to FIG. 6, a modified embodiment of the inventive spliced laminate 110 is shown, which is identical in all respects with that of FIGS. 1–5 except as described and shown herein. Each of the elements in FIG. 6 corresponding to equivalent elements in FIGS. 1–5 are designated by the same reference numeral, preceded by the numeral 1. Specifically, the FIG. 6 embodiment differs from the FIGS. 1–5 embodiment in that the splice strap 120, if used, is positioned internally, rather than externally as are straps 20 in FIGS. 1–5. This internal placement eliminates the necessity of removing the external clad layer 22 for alclad aluminum laminates, as shown in FIG. 5. The smoother geometry of the modified splice concept may also be advantageous in some design situations because of the resultant reduced aerodynamic drag. Also, this arrangement preserves the ability to inspect the external metallic plies 112 for fatigue, and permits the respective widths of the splice straps 120 to be equal.

Figure 7:
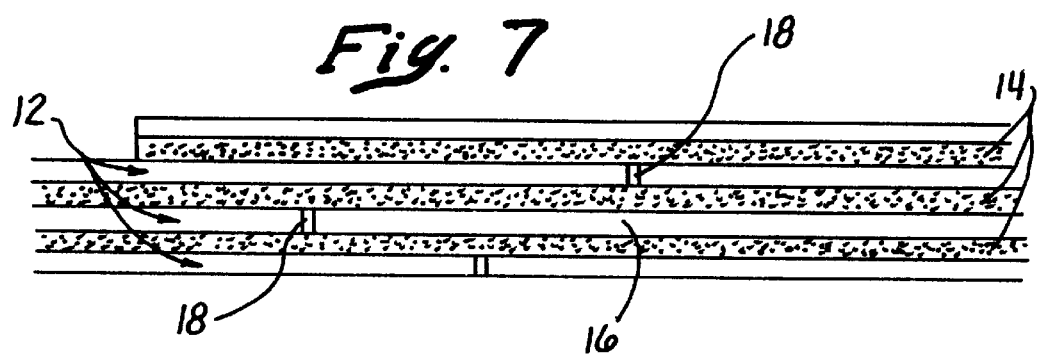
FIG. 7 is a cross-sectional view similar to that of FIG. 3, which shows an optional configuration of the integral splice feature.

FIG. 7 shows an optional configuration of the FIGS. 1–5 embodiment, wherein the integral splice of the laminate 10 occurs at a ply drop location. Ply drops occur at points along the length of the laminate where it undergoes a gauge transition; i.e. where its thickness is decreased in order to satisfy certain design criteria for the fabricated part. In this instance, by allowing the dropped ply to continue across the splice region, it acts as a splice doubler (strap) and thereby precludes the need for a splice strap 20, as shown in FIGS. 1–4. For aluminum laminates, having a clad side and a bare side, the ply drop should occur on the bare side to preserve the environmental durability of the bond. It should be noted that for this embodiment, the laminate strength may be presumed to be equal to that of the lesser buildup through the spliced region. In other words, for the laminate shown in FIG. 7, which has four metal plies 12 and three fiber/ adhesive layers 14 (4/3 configuration) in its full buildup zone, and three metal plies 12 and two fiber/adhesive layers 14 (3/2 configuration) in the ply drop zone, the laminate strength through the spliced region may be presumed to be equal to that of the 3/2 laminate. In the event that pre-stressing of the laminate is desired, this configuration should be stretched along an axis parallel to the splice axis 26.

The subject invention is a novel and unobvious integral splice concept specifically adapted for fiber/metal laminates and resulting in minimal weight and geometric disruption. It may be used to join two or more sheets of the fiber/metal laminates together for aerospace structural applications (i.e, fuselage skins, shear web, pressure bulkheads, wing skins, etc.).

Although an exemplary embodiment of the invention has been shown and described, many changes, modifications, and substitutions may be made by one having ordinary skill in the art without departing from the spirit and scope of the invention. For example, as noted above, the inventive splice concept is equally applicable to extending other dimensions of the laminate structure other than width, such as length, for example. Consequently, the scope of the invention is to be limited only in accordance with the following claims:

What is claimed is:

1. A method for constructing a fiber/metal laminate structure comprising at least two metal plies and at least one fiber layer, said structure having an inboard side and an outboard side, said method comprising the steps of:

establishing an integral splice region along a splice axis within said structure, for extending a desired dimension of the structure, the splice axis being oriented in a direction generally transverse to the desired extension direction;

forming each of said metal plies by laying two metal sheets adjacent to one another such that there is a sheet metal break therebetween which lies within said integral splice region;

arranging said laminate by ensuring that each of said at least one fiber layers is positioned between adjacent ones of said at least two metal plies;

positioning said sheet metal breaks such that the sheet metal break in each metal ply is staggered in the extension direction with respect to the sheet metal breaks in the remaining metal plies in accordance with a predetermined metal break staggering pattern;

ensuring that each of said at least one fiber layers is continuous through the integral splice region; and positioning a first splice strap on said inboard side and a second splice strap on said outboard side of said structure, such that both of said splice straps are disposed within said integral splice region and function to reinforce said laminate structure within said region.

2. The method as recited in claim 1, and further comprising the step of pre-stressing the structure by stretching it as a single unit, including the integral splice region, in a direction either generally parallel to or generally perpendicular to said splice axis, thereby creating favorable residual stresses in the entire structure.

3. A method for constructing a fiber/metal laminate structure comprising at least two metal plies and at least one fiber layer, said method comprising the steps of:

establishing an integral splice region along a splice axis within said structure, for extending a desired dimension of the structure, the splice axis being oriented in a direction generally transverse to the desired extension direction;

forming each of said metal plies by laying two metal sheets adjacent to one another such that there is a sheet metal break therebetween which lies within said integral splice region;

arranging said laminate by ensuring that each of said at least one fiber layers is positioned between adjacent ones of said at least two metal plies;

positioning said sheet metal breaks such that the sheet metal break in each metal ply is staggered in the extension direction with respect to the sheet metal breaks in the remaining metal plies in accordance with a predetermined metal break staggering pattern; and ensuring that each of said at least one fiber layers is continuous through the integral splice region;

wherein said integral splice region is established in the vicinity of a ply drop location, said dropped ply being continued across the integral splice region to act as a splice doubler, thereby precluding the need for a splice strap.

4. The method as recited in claim 3, and further comprising the step of pre-stressing the structure by stretching it as a single unit along an axis generally parallel to the splice axis.

* * * * *